Nov. 17, 1925.
F. G. ERICKSON ET AL
1,562,426
MOTOR CAR STAND
Filed July 13, 1921
2 Sheets-Sheet 2
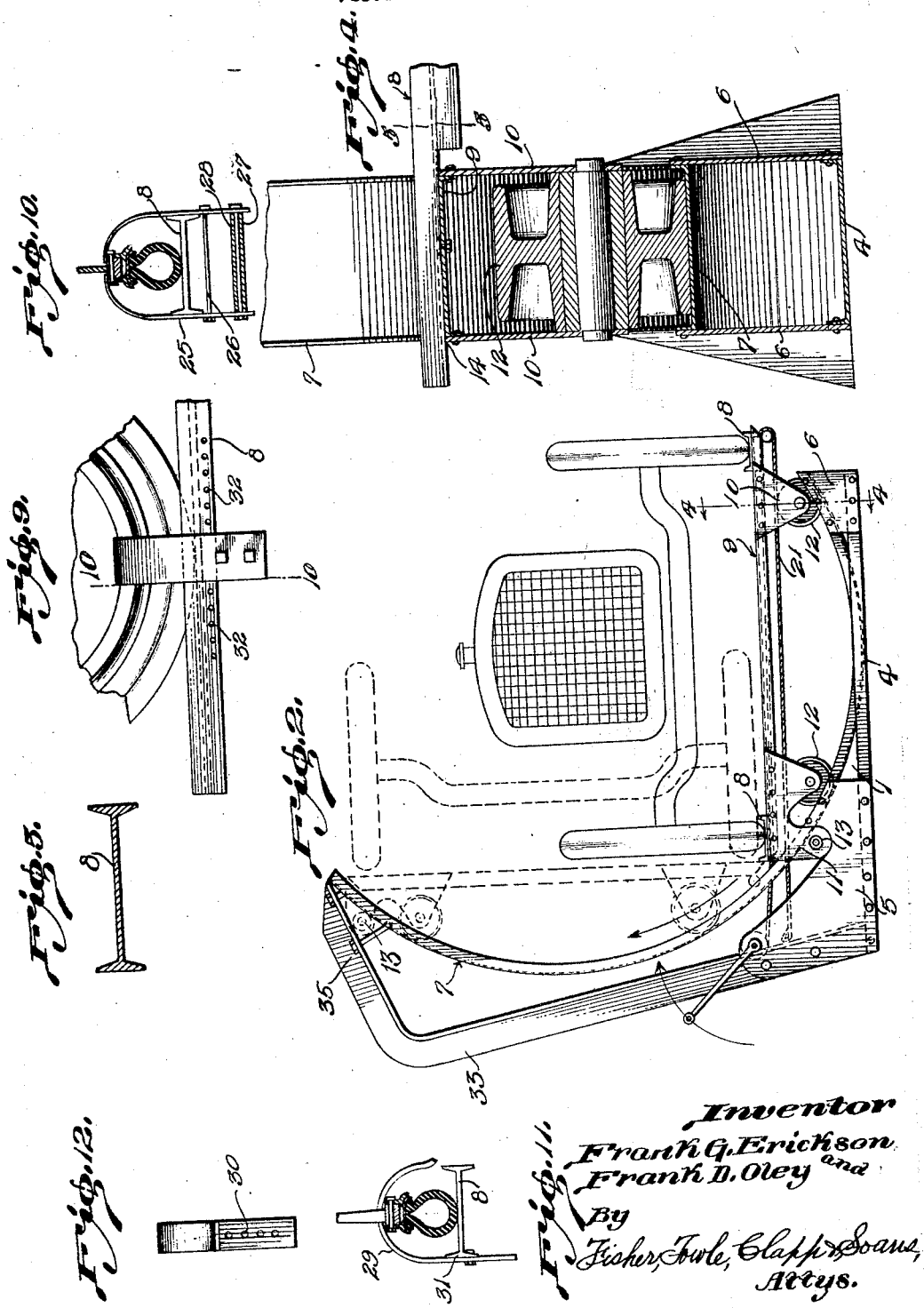
Inventor
Frank G. Erickson
Frank D. Oley
By
Fisher, Fowle, Clapp & Soans,
Attys.

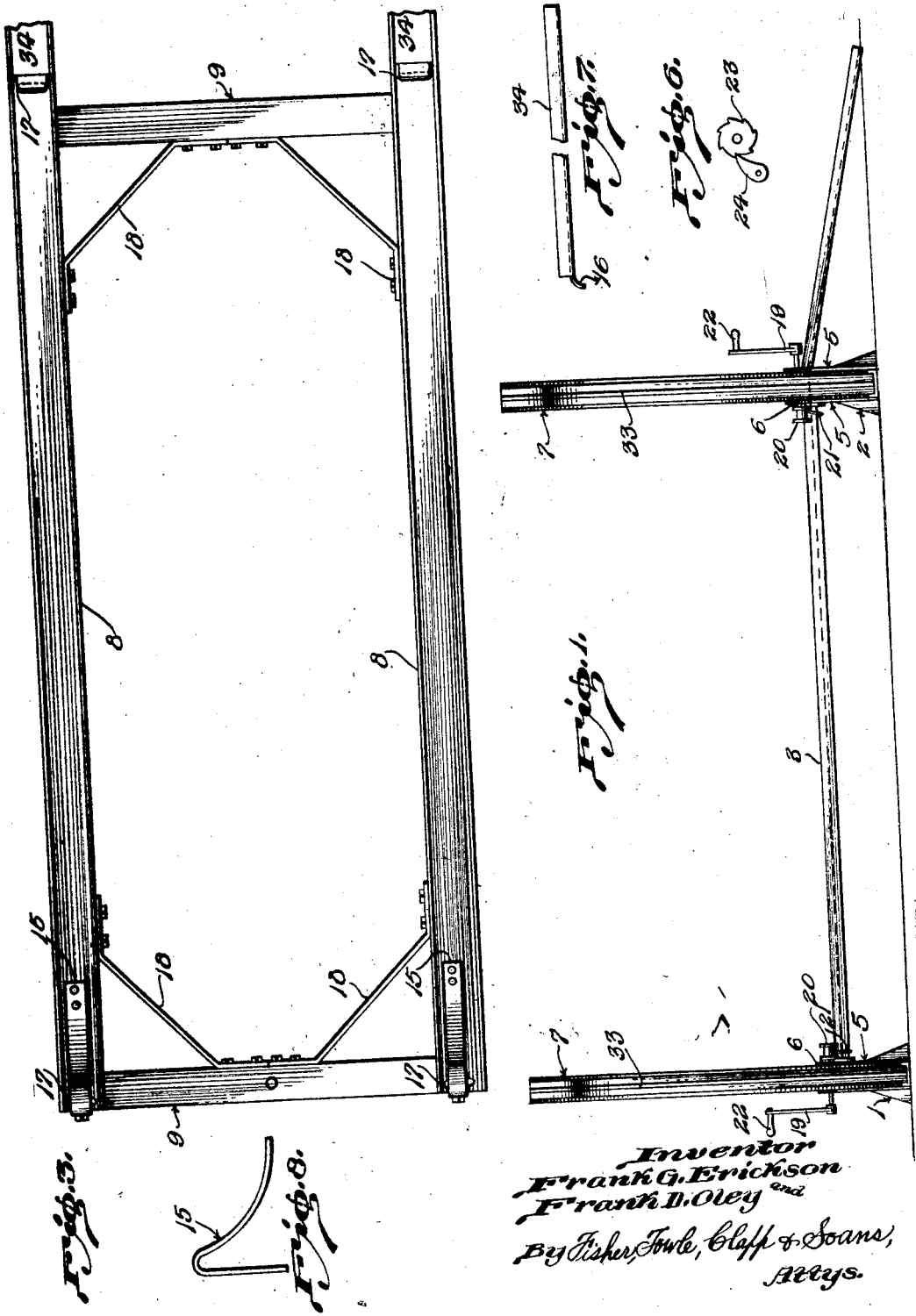

Patented Nov. 17, 1925.

1,562,426

UNITED STATES PATENT OFFICE.

FRANK G. ERICKSON AND FRANK D. OLEY, OF KENOSHA, WISCONSIN.

MOTOR-CAR STAND.

Application filed July 13, 1921. Serial No. 484,340.

*To all whom it may concern:*

Be it known that we, FRANK G. ERICKSON and FRANK D. OLEY, both citizens of the United States, residing at Kenosha, in the county of Kenosha, State of Wisconsin, have invented certain new and useful Improvements in Motor-Car Stands, of which the following is the specification.

Our invention has reference more particularly to a device for turning a motor car up sidewise and holding it in the upturned position so that access may be conveniently had to the underside of a car for making repairs and adjustments.

It is often desirable to work on the underside of a car but owing to the fact that the car body is hung quite close to the ground it is inconvenient unless a pit is provided under the car or the car elevated above the floor. Devices have been provided for lifting the car at one end so as to afford greater convenience in working under the car, but such an arrangement has the disadvantage that the work is above the operator, and, therefore, inconvenient and moreover, there is danger that the hoist or support may give way and injure the operator when he is working under the car.

The principal objects of our invention are to provide a device for turning the car up sidewise so that the underside of the car assumes an upright position and is accessible to an operator or workman standing at the side of the car; to construct the device so that the center of gravity of the supported car is not materially changed during the elevating operation, thus rendering it possible to adjust the car to the required position with a minimum of effort; to provide improved means for supporting the car and carrying same to the working position; to provide improved means for adjusting the car and holding it in the adjusted position and in general, to provide a motor car support which is of simple form, constructed at a low cost and adapted to adjust the car to a position wherein the underside of the car is conveniently accessible without danger of injury to the workmen in case the car is accidentally displaced from the working position.

On the drawings—

Fig. 1 is a side view of the motor car stand;

Fig. 2 an end view thereof looking at the right hand end of the structure shown in Fig. 1;

Fig. 3 is a top view of the carriage upon which the car is supported;

Fig. 4, an enlarged sectional view on the line 4—4 of Fig. 2;

Fig. 5, a sectional view of one of the supporting rails taken on the line 5—5 of Fig. 4;

Fig. 6, a sectional view on the line 6—6 of Fig. 1;

Fig. 7, a side view of one of the detachable end approaches, which we use for running the car onto the stand;

Fig. 8, a side view of one of the stops for limiting the movement of the car on the carriage;

Fig. 9, a side view of a clamp for locking the car on the carriage;

Fig. 10, a sectional view on the line 10—10 of Fig. 9;

Fig. 11, a view similar to Fig. 10, showing another form of clamp, and

Fig. 12, a side view of the clamp hook shown in Fig. 11.

Referring to the drawings the reference numerals 1 and 2 indicate end standards, which are alike and spaced apart a suitable distance to accommodate a carriage 3 therebetween for supporting a motor car so that the latter may be turned up sidewise to afford access to the bottom. The standards 1 and 2 may be secured to the floor and thus held in the required spaced relation or they may be connected together by longitudinal members. Each of these standards comprises a bottom plate 4 preferably of channel iron with a pair of side plates 5 and 6 extending upwardly from each end so as to support a semi-circular track 7 in the position shown, said track being preferably formed of channel iron having the flanges extending inwardly, and there is a post 33 secured between the plates 5 and extending upwardly as shown and having the upper end bent laterally and secured to the upper end of the track member 7 to brace same.

The carriage 3, which supports the car comprises spaced rails 8 which are preferably of I-beams and are supported at opposite ends on an inverted channel iron cross member 9, which has plates 10 and 11 at opposite ends carrying wheels 12, which ride on the channel iron 7 between the flanges thereof. The plates 11, which extend beyond the end of the channel iron 9 and straddle the track 7, have a roller 13 mounted therebetween to engage the underside of the channel iron 7 and hold the carriage 3 from tipping sidewise off of the track 7 when the carriage is in the elevated position.

In order to conveniently attach the rails 8 to the cross members 9, the flanges on the underside of the rails are cut away as shown at 14 in Fig. 4, so that the cross web rests upon and is bolted directly against the top of the channel iron cross member 9 and these rails 8 at one end have stops 15 secured thereon to limit the movement of the car when it is driven onto the rails 8. For forming an approach on which the car is driven onto the rails 8, we provide a channel iron extension 34 for each side rail 8 with a downturned tongue 16 at one end, which is adapted to engage in a transverse slot 17 in the end of the rail 8. The rail 8 and cross members 9 may also be reinforced by corner braces 18, which have the ends bolted respectively to the rails 8 and cross member 9.

For operating the carriage 3 on the track 7 each pair of bracket plates 5 has extensions in which a shaft 19 is journaled, the said shaft being provided with a winding drum 20 thereon around which passes a cable 21 which is connected to the opposite side of the carriage 3. Each shaft 19 has a crank handle 22 for operating same and there is also a ratchet wheel 23 on each winding drum 20, which is adapted to be engaged by a ratchet pawl 24 on one of the side plate 5 for holding the drum against reverse movement after the carriage has been elevated.

Obviously, as the car is tipped up sidewise it is necessary to provide some means to hold the car in place on the carriage. This may be accomplished in a number of different ways, as for example by means of clamps on the rails 8, which engage over the rim of the car wheel. The clamping device shown in Figs. 9 and 10 is designed particularly for use in connection with disk wheels and consists of a pair of side plates 25, which are turned inwardly at their upper ends so as to engage part way over the rim of the wheel at opposite sides of the wheel disk, these plates being secured in position by a pair of clamping bolts 26 and 27, the latter of which is embraced by a pipe spacer 28, which causes tightening of the bolt 26 to clamp the plates against the opposite sides of the I-beam 8.

For securing a car having wheels of the artillery type, a single clamping member such as shown at 29 in Figs. 11 and 12 may be employed having a hooked upper end which engages over the rim of the wheel. The side plate portion of this hook has a row of apertures 30 which are engaged by a bolt 31 passing through one of a series of apertures 32 in the I-beams 8, said apertures 30 permitting vertical adjustment so that the hook portion of the clamp may be caused to bear closely against the top of the rim.

In the operation of this device an approach plate 34 is mounted at the end of each I-beam 8 as shown in Figs. 1 and 3, and the car is driven up the approach plates onto the I-beams 8 until the wheels come in contact with the stops 15. The wheels of the car are then secured to the I-beams by either of the clamping devices shown in Figs. 9 to 12 inclusive, or any other suitable means, after which the shafts 19 are rotated by the crank handles 22, so as to rotate the winding drums 20 thereby causing the carriage 3 to move laterally and upwardly over the curved tracks 7 until the carriage and car thereon is carried from the position shown in full lines to the position shown in dotted lines, the elevation of the car and carriage being limited to a position in which the underside of the car occupies an upright position by engagement of the roller 13 with the upper end of the post 33. When the car is turned to this position a bolt 35 may be inserted through the upper end of the brace or post 33 and the rail 7 below the roller 13 as shown so as to securely hold the car in the adjusted position, and when positioned access may be readily had to the underside of the car by an operator standing at the side of the supporting frame.

While we have shown and described our invention in a preferred form, we are aware that various changes and modifications may be made without departing from the principles of our invention.

We claim as our invention:

1. In a motor car stand, the combination of a supporting frame comprising a pair of spaced tracks extending laterally and upwardly, a carriage thereon for supporting the motor car and having a pair of track wheels at each end thereof at opposite sides respectively of the carriage and means for moving the carriage laterally and upwardly on the tracks so as to tip up the car thereon sidewise and position the bottom in substantially an upright position.

2. In a motor car stand, the combination of a pair of spaced standards, a correspondingly arranged curved track on each standard extending laterally and upwardly, a carriage for supporting a motor car mounted on the said tracks comprising a pair of laterally spaced longitudinally extending supporting beams connected together at their ends and having a track wheel adjacent each end of each supporting beam, and hoisting mechanism for moving the carriage laterally and upwardly on the tracks.

3. In a motor car stand, the combination of a pair of spaced supporting frames, each of which has a correspondingly arranged semi-circular track extending laterally and upwardly therefrom, a carriage extending lengthwise between the tracks and provided at the ends with laterally spaced rollers operating on the track so that the center of gravity of a motor car supported on the carriage is maintained substantially at the center of curvature of the semi-circular tracks in all positions of adjustment of the carriage, means for adjusting the carriage laterally and upwardly on the semi-circular tracks and holding the carriage in the adjusted positions, and means for holding the carriage on the track.

4. In a motor car stand, the combination of a main frame comprising a pair of correspondingly arranged semi-circular channel iron tracks spaced apart and extending laterally and upwardly, a carriage having a pair of spaced channel iron members affording a track for a motor car and having the corresponding ends connected together by a cross member, a pair of supporting wheels on each cross member engaging the semi-circular channel iron between the flanges thereof, means for holding the cross members against displacement from the track, a winding drum at the side of the frame, having a flexible connection with the carriage at the opposite side for moving said carriage laterally and upwardly on the track, and means for locking the winding drum so as to hold the carriage in adjusted positions.

FRANK D. OLEY.
FRANK G. ERICKSON.